United States Patent
Schwesig et al.

(10) Patent No.: US 7,177,872 B2
(45) Date of Patent: Feb. 13, 2007

(54) INTERFACE FOR MEDIA PUBLISHING

(75) Inventors: Carsten Schwesig, Tokyo (JP); John Poisson, Hooksett, NH (US); Eduardo Sciammarella, New York, NY (US); Norikazu Hiraki, Kanagawa (JP); Ryoichi Imaizumi, Tokyo (JP)

(73) Assignees: Sony Corporation, Tokyo (JP); Sony Pictures, Culver City, CA (US)

( * ) Notice: Subject to any disclaimer, the term of this patent is extended or adjusted under 35 U.S.C. 154(b) by 0 days.

(21) Appl. No.: 10/783,284

(22) Filed: Feb. 20, 2004

(65) Prior Publication Data
US 2005/0076058 A1    Apr. 7, 2005

Related U.S. Application Data

(63) Continuation-in-part of application No. 10/613,349, filed on Jul. 3, 2003.

(60) Provisional application No. 60/480,682, filed on Jun. 23, 2003.

(51) Int. Cl.
*G06F 17/30* (2006.01)

(52) U.S. Cl. .................. 707/10; 707/104; 709/213; 455/3.01

(58) Field of Classification Search .............. 707/1, 707/104.1, 10; 725/105; 704/1; 709/213; 455/3.01
See application file for complete search history.

(56) References Cited

U.S. PATENT DOCUMENTS 6,774,926 B1 *   8/2004   Ellis et al. ............... 348/14.01
2002/0056119 A1 *   5/2002   Moynihan .................... 725/87
2002/0104099 A1 *   8/2002   Novak ......................... 725/136
2003/0046240 A1 *   3/2003   Stone et al. .................. 705/51
2003/0184793 A1 *   10/2003   Pineau ........................ 358/1.15
2004/0070678 A1 *   4/2004   Toyama et al. ............ 348/231.3
2004/0260669 A1 *   12/2004   Fernandez .................... 707/1

FOREIGN PATENT DOCUMENTS

WO    WO 01/19084    *    3/2001

* cited by examiner

*Primary Examiner*—Leslie Wong
(74) *Attorney, Agent, or Firm*—Samuel S. Lee; Procopio, Cory, Hargreaves & Savitch LLP

(57) ABSTRACT

Methods and apparatus publishing media data includes: accessing a media interface of a media device; capturing media data using a media capture component of said media device; storing said captured media data in a media file in storage of said media device; modifying said captured media data; and publishing said modified media data to a network server; wherein said capturing, modifying, and publishing are performed using said media interface, which is accessed through a single and same operation of said media device; wherein said performance of said capturing, modifying, and publishing using said instant publish command is made possible by initially configuring the media device with settings for edits, user metadata, and automatic metadata to be added to said captured media data, and by selecting a publishing recipient and any desired publishing rules provided by a selected publishing service.

21 Claims, 5 Drawing Sheets

INTERFACE FOR MEDIA PUBLISHING

This application claims the benefit of U.S. Provisional Patent Application No. 60/480,682, filed Jun. 23, 2003, the disclosure of which is incorporated herein by reference.

This application is a continuation-in-part of U.S. patent application Ser. No. 10/613,349, filed Jul. 3, 2003, the disclosure of which is incorporated herein by reference.

BACKGROUND

Sharing pictures and video among people is often a popular form of entertainment. With the growing popularity of the Internet, sending images across the Internet has also become more popular.

Recently, mobile devices such as cellular phones and PDA's (Personal Digital Assistants) include media capture devices such as cameras and microphones. In addition, some devices have data network capability. Accordingly, it is desirable to provide users of these mobile devices with a convenient and enjoyable environment for sharing images and audio across networks.

SUMMARY

The present invention provides methods and apparatus for implementing an interface for media publishing. In one implementation, a method of publishing media data includes: accessing a media interface of a media device; capturing media data using a media capture component of said media device; storing said captured media data in a media file in storage of said media device; modifying said captured media data; and publishing said modified media data to a network server; wherein said capturing, modifying, and publishing are performed using said media interface.

In another implementation, a media device includes: a control component; a media capture component connected to said control component; a media interface connected to said control component; storage connected to said control component and to said media capture component; and a network interface connected to said control component and to said storage; wherein said media interface provides one or more media configuration commands to set one or more configuration settings, a capture media command to capture media using said capture media component, one or more editing commands to edit captured media data, and a publish command to publish media data through said network interface.

DETAILED DESCRIPTION

Figure 1:
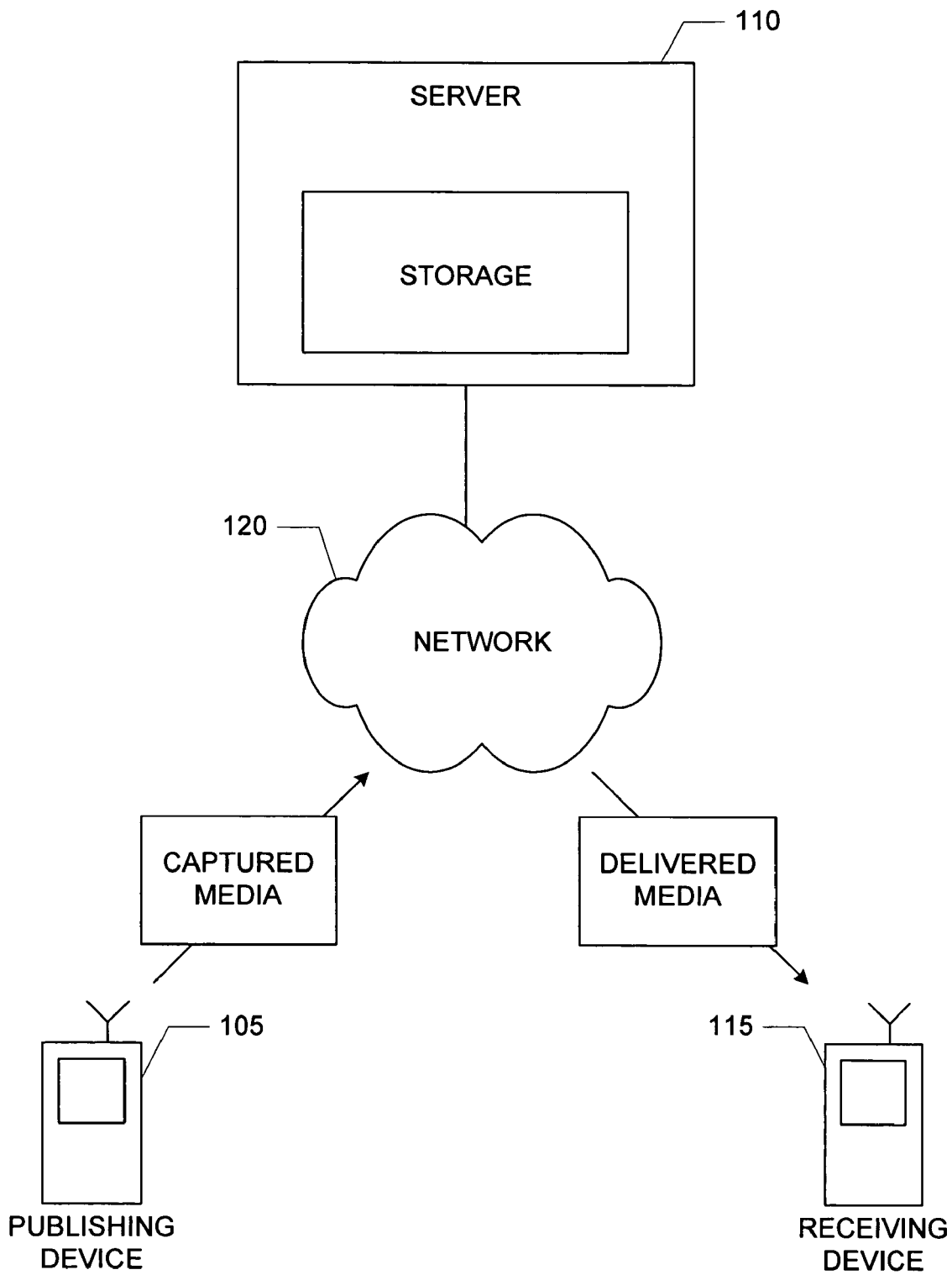
FIG. 1 shows an example of a network environment supporting a publishing device, a server, and a receiving device.

The present invention provides methods and apparatus for implementing an interface for media publishing. In one implementation, a system provides a media publishing interface for creating media data, preparing the media data, and publishing the media data. In another implementation, the media interface also provides accessing and presenting published media data. The interface supports a continuous process to allow a user to capture and publish media data easily and efficiently.

In one example of one implementation, a PDA (personal digital assistant, such as a Clie™ provided by Sony Corporation) includes a camera and a media publishing interface. In other implementations, the PDA includes other media input devices as well, such as a microphone. A user initially configures the PDA to indicate the user's preferences for capturing, preparing, and publishing media data (e.g., data representing audio and/or video). For example, the user indicates the user's name, a preferred server or service to receive published media data, and access permissions for published media data. Configuration data can also be set by the PDA manufacturer (e.g., at manufacturing) or network service provider (e.g., at service sign-up, periodically, or negotiated when publishing data).

The user activates the media interface to capture an image. For example, the user half-presses an image capture button on the PDA or selects an icon or soft button in a graphical user interface of the PDA. The media interface controls the camera of the PDA to allow the user to select an image for capture. The media interface displays the current image picked up by the camera. The user selects an image to capture and the PDA stores the captured image. For example, the PDA displays a changing image as picked up by the camera while the image capture button is half-pressed and captures the current image when the image capture button is fully pressed.

After capturing an image, the media interface provides preparation options to the user. The preparation options allow the user to edit or modify the captured image and add user metadata to the captured image. The user can edit the image in various ways to change the captured image, such as by cropping, rotating, or resizing the image, or applying a visual effect to the image, such as a blur or color filter or correction. The user can also add the captured image to a stored image for a mosaic, overlay, or transition effect. The user can add user metadata to annotate the image, such as adding a comment or title, or descriptive parameters, such as a "mood" value reflecting the capturing user's subjective mood at the time (e.g., selected from a list, or using a hard or soft sliding mechanism). The user can add other media data as metadata, such as a voice comment or stored sound effect. The user can also select automatic metadata for addition. The automatic metadata is collected or generated by the PDA at the time of the media capture, such as a GPS value, a temperature, biometric information (e.g., verifying the user identity or estimating a user quality such as mood, energy, stress, blood pressure, heart rate, or blood alcohol level). The user can also indicate in the configuration of the PDA what automatic metadata to include with captured media. The PDA attaches the metadata to the captured media data.

After entering and selecting edits and metadata, the user publishes the prepared media data (including the captured and modified media data and any attached metadata). The user selects a publishing recipient (e.g., a web server or a home media server) or accepts the recipient established during configuration. The PDA sends the prepared media data to a publishing server through a network connection, such as a wireless air interface to an Internet service provider (re-sending the data as appropriate until confirmation is received). The publishing server receives the prepared media data and makes the prepared media data accessible according to the publishing rules established for the user. The publishing access can be established by the user when the user first sets up the publishing account with the service provider or configured by the user and service provider dynamically, such as during publishing or as part of the metadata for the prepared media data.

In another example, the PDA provides "one-click publishing" for a user. The user initially configures the PDA with settings for edits, user metadata, and automatic metadata to be added to captured media data. The user also selects a publishing recipient and any desired publishing rules provided by the selected publishing service. Alternatively, some or all of these selections and configurations are set by the manufacturer or service provider. The media publishing interface is accessed through a single command, such as a publish button. When the user presses the publish button, the PDA captures an image as media data, prepares the captured media data by performing any modifications and attaching any metadata indicated by the PDA's configuration, and publishes the prepared media data to the selected publishing server. In this way, the user can add media data with desired metadata to a publishing server with a single user action—with "one click."

In additional implementations, other devices or systems provide the media publishing interface and other configurations and options are available. For example, the media interface can be provided through a wireless telephone or a car, and the captured media can be audio and/or video (still or moving).

Network Environment

FIG. 1 shows an example of a network environment 100 supporting a publishing device 105, a server 110, and a receiving device 115. In one implementation, the mobile devices 105, 115 are camera mobile phones (e.g., a cellular phone including a digital camera capable of recording still and moving images). The server 110 is a network server including storage for media files and network connections to support receiving and delivering media files. The server 110 and mobile devices 105, 115 are interconnected through a network 120, such as a combination of wireless networks and the Internet.

In one example of operation, a user, X, of the phone 105 accesses the media interface of the phone 105 and captures several seconds of audio and video data of an interesting event at a party, storing the media data into a multimedia file in the phone 105. X uses an editing tool of the phone 105 to adjust the brightness of the video data and add a text title of "Friday Night" to the media file. X's phone 105 adds metadata to the media file indicating the time when the media file was created and updated, as well as the location of the phone 105 when the media file was created using an embedded GPS system. In one implementation supporting media channels, X's phone 105 also adds metadata to the media file indicating the media file is for a network media channel X had previously created, called "X's Life." (Media channels are discussed further in U.S. patent application Ser. No. 10/613,349, as referenced above.) X enters a publish command to publish the Friday Night media file to the X's Life network media channel. In this example, the commands for capturing the media, editing the media, and publishing the media are all from within the same interface on the phone 105. In another implementation, the operations are all invoked by a single instant publish command. In that case, any editing by the user is handled automatically according to parameters previously input by the user.

X's phone 105 sends the Friday Night media file to a server 110 through the network 120. The server 110 receives the media file and stores the media file for later access by other users. The media file has now been published. When a user Y of the second phone 115 requests the media file from the server 110, the server 110 sends the file to the second phone 115. Similarly, X can also access published media files (including those published by X) from the server 110 through X's phone 105. In an implementation supporting media channels, the server 110 associates the media file with the appropriate media channel(s) and provides the published media file to the subscribers of the media channel.

In other implementations, different types of devices can use the media interface of the invention, such as PDA's, computer systems, embedded systems, etc.

Media Device Having a Media Interface

Figure 2:
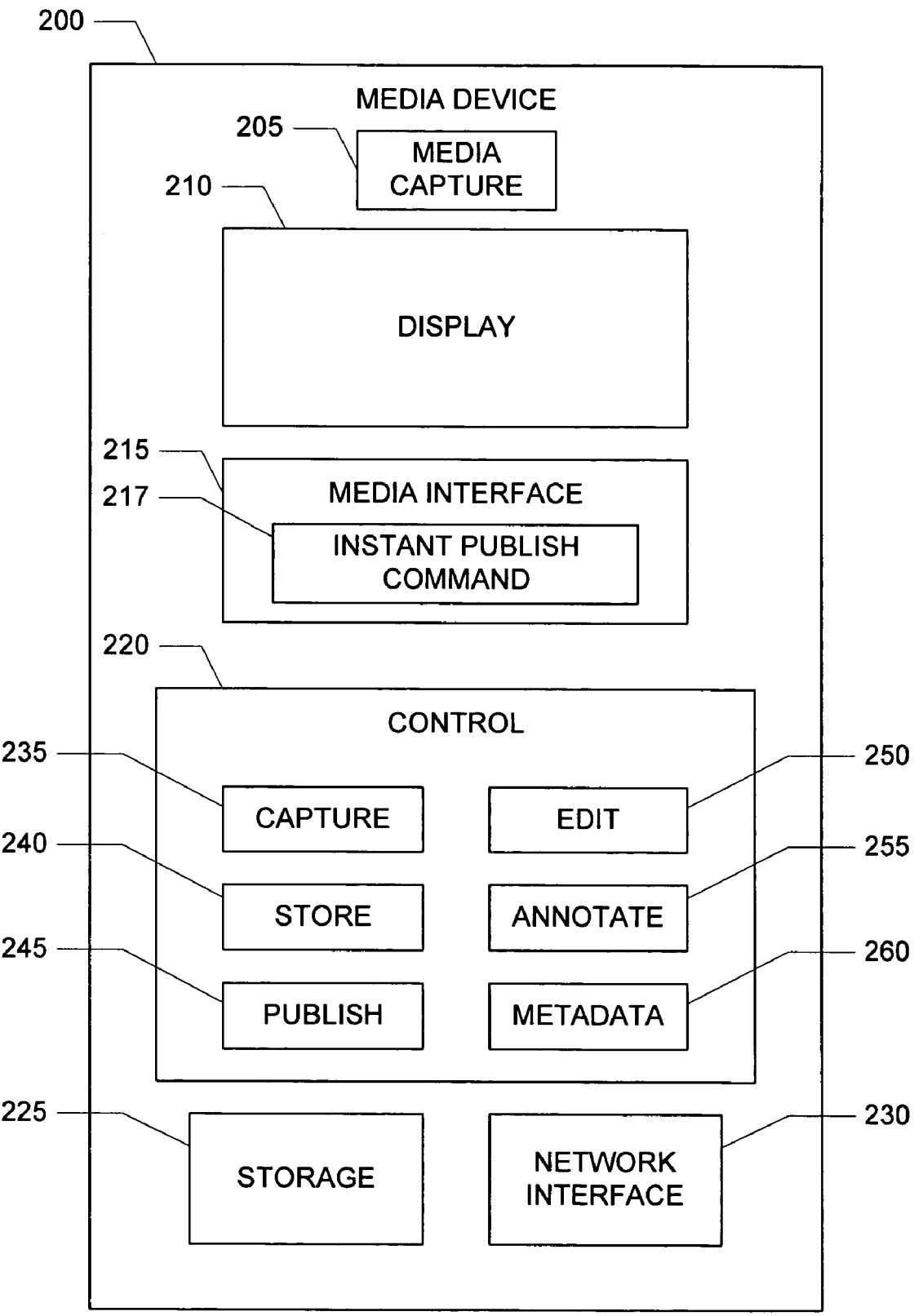
FIG. 2 shows a block diagram of a media device supporting a media interface according to one implementation of the invention.

FIG. 2 shows a block diagram of a media device 200 supporting a media interface according to one implementation of the invention. The media device 200 (also referred to as a publishing device) includes a media capture component 205, a display 210, a media interface 215, a control component 220, storage 225, and a network interface 230. These components are interconnected, and though the interconnections are omitted from FIG. 2, the interconnections should be readily appreciated by one of ordinary skill in the art.

The media capture component 205 includes one or more input devices for capturing media data, such as for capturing audio, video, or still imagery. Examples of input devices include, but are not limited to, a digital camera and a microphone.

The display 210 is a visual display for presenting the captured media data to a user, such as an LCD screen. The display 210 also provides visual feedback to a user of the operation of the media device 200.

The media interface 215 provides a user interface including one or more user input and output devices for a user to interact with and input commands into the publishing client 200. Examples of user input devices include, but are not limited to, a keypad, a button, a switch, a joystick, a touchscreen, and a microphone. Examples of user output devices include, but are not limited to, an LED and a speaker. In addition, one or more user input devices can also be used as a media capture device, such as a microphone, or as a display, such as a touchscreen.

The media interface 215 includes commands or provides access to functionality for publishing media data. The commands control or request operation of the control component 220. In one implementation, the media interface 215 provides one or more media configuration commands, a capture media command, one or more editing commands, and a publish command. The media configuration commands cause the media device 200 to store settings for the user for modifying media data or adding data to captured media data. The capture media command causes the media device 200 to capture media data and store the media data in a media file. The editing commands cause the media device 200 to modify the media data in a media file. The publish command causes the media device 200 to send a media file to a server to be published for access by clients of the server.

The media interface 215 also includes an instant publish command 217. The instant publish command 217 can be provided as a soft command in a selection from multiple commands, such as in a menu or a collection of soft buttons in a display, or a hard command, such as a button. Activating the instant publish command 217 causes the media device 200 to capture, modify, and publish media data, at one action from a user. The instant publish command can provide a user with "one-click publishing" (OCP) through publishing from pressing a single button of the media device 200. The media device 200 uses configuration settings set through configuration commands to automatically modify captured media data for an instant publish command. The operation of the instant publish command is described further below referring to FIG. 5.

In another implementation, one or more of the commands of the media interface can be activated through a remote command. The remote command can be received through a wired or wireless interface (such as through the Internet, infrared, Bluetooth, Wi-Fi, etc.). In this case, the mobile device includes an appropriate receiver and component to receive and process the remote commands. In one implementation, the instant publish command is available as a remote command. Similarly, in another implementation, the instant publish command (or other commands) can be automated to activate according to conditions defined in configuration settings, such as at regular time intervals.

The control component 220 is for controlling the operation of the media device 200, including each of the components within the media device 200. In one implementation, the control component 220 includes a microprocessor and some or all of the control functionality is provided by software executed by the microprocessor. The control component 220 also includes several specialized control components: a capture component 235, a store component 240, a publish component 245, an edit component 250, an annotate component 255, and a metadata component 260. In one implementation, one or more of the specialized components can be combined into a single component. In another implementation, the specialized control components of the control component 220 are implemented as a single software package.

The capture component 235 controls capturing media data using the media capture component 205. The store component 240 controls storing data and managing stored data in the storage 225. As described below, media data is stored in media files.

The publish component 245 controls publishing media data to a server through the network interface 230. When media channels are supported, the publish component 245 maintains information indicating the currently selected publishing channel. The publishing channel is the network media channel to which a media file is to be published. The user can change the selected publishing channel through the display 210 and media interface 215.

The edit component 250 controls editing captured media data using the display 210 and media interface 215. Editing media data includes changing the media data or adding non-destructive changes to the media data. Examples of media data editing include, but are not limited to, cropping, re-sizing, applying or changing colors, applying visual or audio filters, adjusting volume or tone, and changing the storage format of the media data (e.g., from JPEG to GIF).

The annotate component 255 controls adding annotations to media data using the display 210 and the media interface 215. Examples of annotations include, but are not limited to, text comments, titles, audio comments, and visual marks added to an image.

The metadata component 260 controls generating metadata and adding metadata to media data. The metadata component 260 generates automatic metadata using status components and data and can also receive user metadata from a user, another component of the media device 200, or an external device. Metadata can include many types of data, such as to assist in processing and organizing the media data. Examples of metadata include, but are not limited to, timestamps (e.g., from a clock of the publishing client), keywords, user or author information, authorization information (e.g., an access code or password), subject information, location information (e.g., GPS information), environment information (e.g., temperature data), biometric information (e.g., user heart rate), and user status information (e.g., subjective evaluation of a user's mood through a combination of biometric factors), and network media channel information (e.g., indicating the publishing channel). In one implementation, the publishing client maintains a user profile to provide metadata for media files created by the user. The metadata component 260 adds the metadata to the media file storing the media data. In one implementation, the metadata for a media file to be published includes at a minimum a timestamp and network media channel indicator to identify to which channel the media file is to be published.

When the instant publish command 217 has been activated, the control component 220 coordinates the activity of its subcomponents to capture, edit, annotate, and publish media data in a media file.

The storage 225 is a memory device for storing media data in media files. The storage 225 also stores configuration settings input by the user and metadata from the user or generated by the media device 200. Examples of storage include, but are not limited to, embedded nonvolatile memory such as a hard or optical disk or flash memory, and removable memory such as a PCMCIA memory card.

The network interface 230 provides the connection between the media device 200 and the network or another device for publishing media files. In one implementation, the network interface 230 is an air interface for establishing and providing a wireless connection (e.g., to a base station), such as a CDMA interface. In another implementation, the network interface 230 provides a wired connection to a local network.

Server

Figure 3:
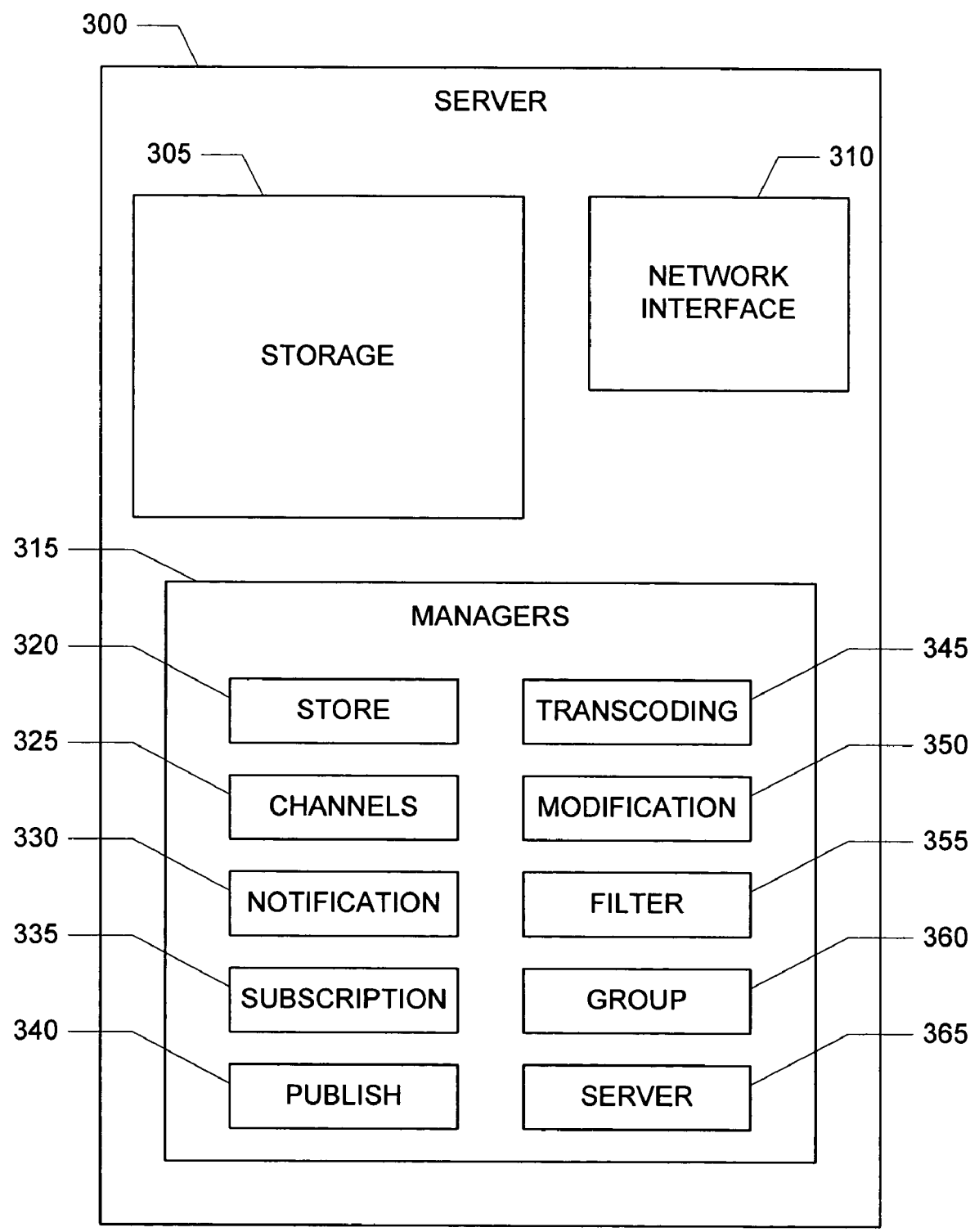
FIG. 3 shows a block diagram of a server supporting client device using a media interface according to one implementation of the invention.

FIG. 3 shows a block diagram of a server 300 supporting client device using a media interface according to one implementation of the invention. The server 300 includes storage 305, a network interface 310, and a collection of managers 315. As in FIG. 2, these components are interconnected, and though the interconnections are omitted from FIG. 3, the interconnections should be readily appreciated by one of ordinary skill in the art.

The storage 305 and network interface 310 in the server 300 are substantially similar to those in the publishing device 200, as described above. The storage 305 stores media data in media files for access by client devices through the network, such as using network media channels. In one implementation, the storage 305 uses a hierarchical storage system based on the network media channels. In another implementation, the storage 305 is distributed across multiple devices or systems, or distributed among storage systems connected by the network. The network interface 310 provides a connection between the server and the clients (e.g., publishing devices and devices accessing media files stored on the server 300, such as clients subscribing to media channels).

The managers 315 are for controlling the operation of the server 300, including each of the components within the server 300. In one implementation, the server 300 includes one or more microprocessors and some or all of the control and manager functionality is provided by software executed by the microprocessor. In one such implementation, each of the managers executes as a respective process. The managers 315 include several specialized managers: a store manager 320, a channels manager 325, a notification manager 330, a subscription manager 335, a publish manager 340, a transcoding manager 345, a modification manager 350, a filter manager 355, a group manager 360, and a server manager 365. In an implementation that does not support media channels, some or all of the managers associated with channels (e.g., the channels manager 325), or those aspects related to channels, can be omitted or disabled.

The store manager 320 controls storing media data in the storage 305. The store manager 320 ensures that the received published media files are properly categorized and associated with the correct network media channels.

The channels manager 325 controls the creation, deletion, and management of network media channels. The channels manager 325 processes requests to add or remove network media channels, and creates and updates information for channels appropriately. For example, in one implementation, the channels manager 325 determines from what client the request to create the new channel came and restricts publishing media files to the new channel to that same client (in conjunction with the publish manager, described below). In one implementation, one or more network media channels are created as restricted channels, and only authorized subscribing clients are permitted to subscribe to a restricted channel. The channels manager 325 maintains information about whether a channel is restricted or not, and if so, what authorization is required to subscribe (e.g., a password or membership in a group or list).

The notification manager 330 manages changes to the media files for each network media channel. The notification manager 330 builds a notification page for each channel indicating the state of changes to media files for that channel, such as the addition of new media files. In another implementation, the notification manager 330 sends direct notifications to subscribing clients indicating that an update to the channel is available.

The subscription manager 335 manages information indicating which users (or what devices) are subscribed to each network media channel provided by the server 300. In one implementation using restricted channels, the subscription manager 335 verifies that a subscribing client is authorized to subscribe to a restricted channel before allowing the subscribing client to become a subscriber for that channel. In one implementation, The subscription manager 335 extracts authorization information from a subscription request received from the subscribing client to authorize the subscription.

The publish manager 340 manages media files received as published files. In one implementation, the publish manager 340 also manages providing published media files to requesting client devices. When channels are supported, the publish manager 340 determines the publishing channel for a media file to be published and arranges for proper storage of the media file. In one implementation, the publish manager 340 retrieves the publishing channel from the metadata of a media file. In one implementation, the publish manager 340 also checks that the media file is authorized to be published to the indicated publishing channel. The publish manager 340 retrieves identifying information or authorizing information from the metadata of the media file. In one implementation, only the publishing client that creates the network media channel can publish to the channel. In another implementation, only members of a defined group can publish to the channel.

The transcoding manager 345 manages providing a published media file in a requested format. One type of metadata associated with a subscriber or a request for a media file indicates in what format the media file it to be delivered. When a subscriber requests a media files in a format different from that in which the media file is stored in the storage 305, the transcoding manager 345 causes a new media file to be created and stores a transcoded version (e.g., transcoded from JPEG to GIF) of the original media file in the new media file.

The modification manager 350 manages changes or additions made to media files by subscribing clients. When a client adds an annotation or edits a media file and requests that the change or addition be published in the network media channel, the modification manager 350 incorporates the new or modified media file into the channel. In one implementation, the owner or originator of a channel may prohibit changes or additions to a channel being published to the channel (though changes made to the media files and kept only at the subscribing client might be acceptable).

The filter manager 355 manages any filter channels that have been established by subscribing clients. As discussed above, a filter channel is a collection of media files from one or more target network media channels selected according to a filter query having one or more filter terms or criteria. The filter manager 355 stores the filter profile for the filter channel and extracts media files according to the filter profile. The filter manager 355 allows subscribing clients to subscribe to the filter channel as well.

The group manager 360 manages group channels. A group channel is collection of media files published by different publishing clients. In one implementation, the group channel is similar to a filter and extracts media files from other network media channels. In another implementation, the group channel is similar to a regular network media channel and media files can be published to the group channel directly. A group channel can also be defined or limited by criteria such as time, members, and location.

The server manager 365 manages the operation of the server 300 outside the operations of the other managers.

Publishing Operation Using the Media Interface

Figure 4:
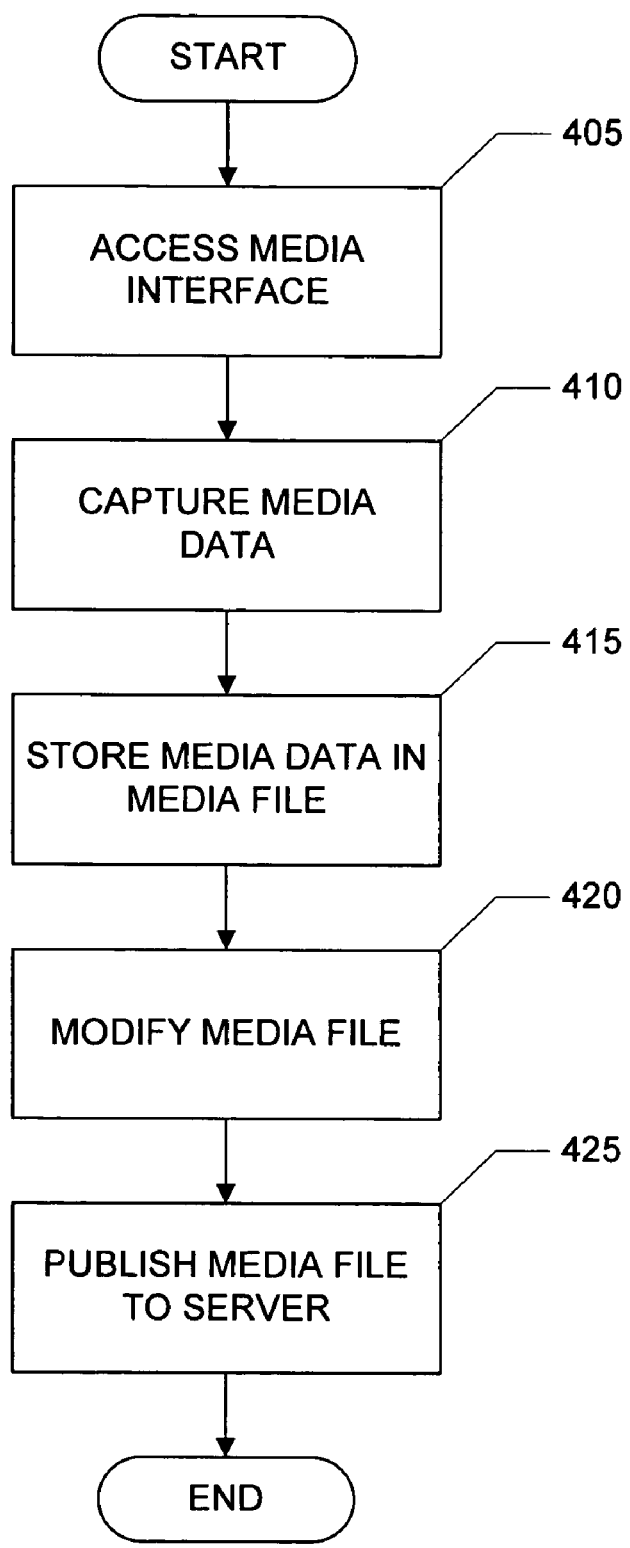
FIG. 4 shows a flowchart of publishing a media file using a publishing device having a media interface according to one implementation of the invention.

FIG. 4 shows a flowchart 400 of publishing a media file using a publishing device having a media interface according to one implementation of the invention, such as in the system 100 shown in FIG. 1. Initially, a user has established one or more configuration settings for a media device, such as user name and current time.

A user accesses the media interface for the publishing device, bock 405. In one implementation, the media interface is a single application executing on the publishing device. In another implementation, the media interface is the user interface for the general operation of the publishing device, including operations for publishing media data.

The user selects a capture media command through the media interface causing the publishing device to capture media data, block 410. As described above, the publishing device includes a media capture device or component for capturing audio, video, text, drawing, or some other form of media data. For example, in one implementation, the publishing device includes a camera and a microphone for capturing audio and still or motion video. In another implementation, a separate device captures the media data and provides the captured media data to the publishing device.

The publishing device stores the captured media data in a media file, block 415. As described above, the publishing device includes storage, such as embedded or removable flash memory. The publishing device creates media files for captured media data and stores the media data in the new file.

The publishing device modifies the media file according to editing commands selected by the user and configuration settings previously set by the user, block 420. As described above, the publishing device provides editing commands for a user to modify, supplement, or annotate the media data in the media file. The user can make various changes to the data, such as resizing or cropping an image, adjusting image qualities (e.g., brightness, contrast, or applying visual effects such as a blur), or changing the format of the media file. The publishing device can treat the changes as destructive or non-destructive (e.g., retractable) to the media data.

The publishing device adds metadata to the media file. Metadata includes user metadata and automatic metadata. User metadata is provided by the user and automatic metadata is provided by or generated by the publishing device. The user can define user metadata as part of the configuration settings for the publishing device or at the time of capture and publishing. In some implementations, a particular item of metadata can be defined as user metadata and as automatic metadata in another implementation. The publishing device can query the user for additional information as appropriate, such as to select a channel for publishing. Other implementations provide more or less metadata, and can also allow a user to select what metadata to include. Examples of metadata include, but are not limited to, time information, publishing channel information (e.g., to what network media channel the media file is to be published), keywords, author information, user information (e.g., personal characteristics of the user such as height, blood type, age, or mood), title, capturing device, publishing device, location, event information, a hierarchical class (e.g., indicating to which category among a group of externally defined categories the media file belongs), links to other media files or network resources (e.g., a URL), a link to another network media channel, and associated channel information (e.g., indicating with which other channels the media file is associated, or with which other channels the publishing channel is associated). In one implementation, information describing the layout and presentation of a media file in the channel can also be added as metadata.

In one implementation, the publishing device provides a preview mode to view the modified media data and metadata before publishing the media file. If the publishing device does not modify the media file, block 420 is skipped.

The user selects a publish command causing the publishing device to publish the media file, block 425. After completing any modifications and additions, the user requests that the publishing device publish the media file. If a publishing channel is needed but has not already been set, the publishing device sets the publishing channel in metadata for the media file, such as using a default media channel for the user or the device. In one implementation, the publishing device confirms the publishing channel with the user. In another implementation, the publishing device indicates multiple publishing channels to publish the media file. The publishing device sends the media file to a server through the network to be published for access by clients of the server, such as through an indicated network media channel. In another implementation, the publishing device sends a link to the server, the link indicating a storage location for the media file.

The server stores the received media file as a published file. In response to access requests from authorized clients, the server provides access to the media data stored in published media files.

Instant Publishing Operation Using the Media Interface

Figure 5:
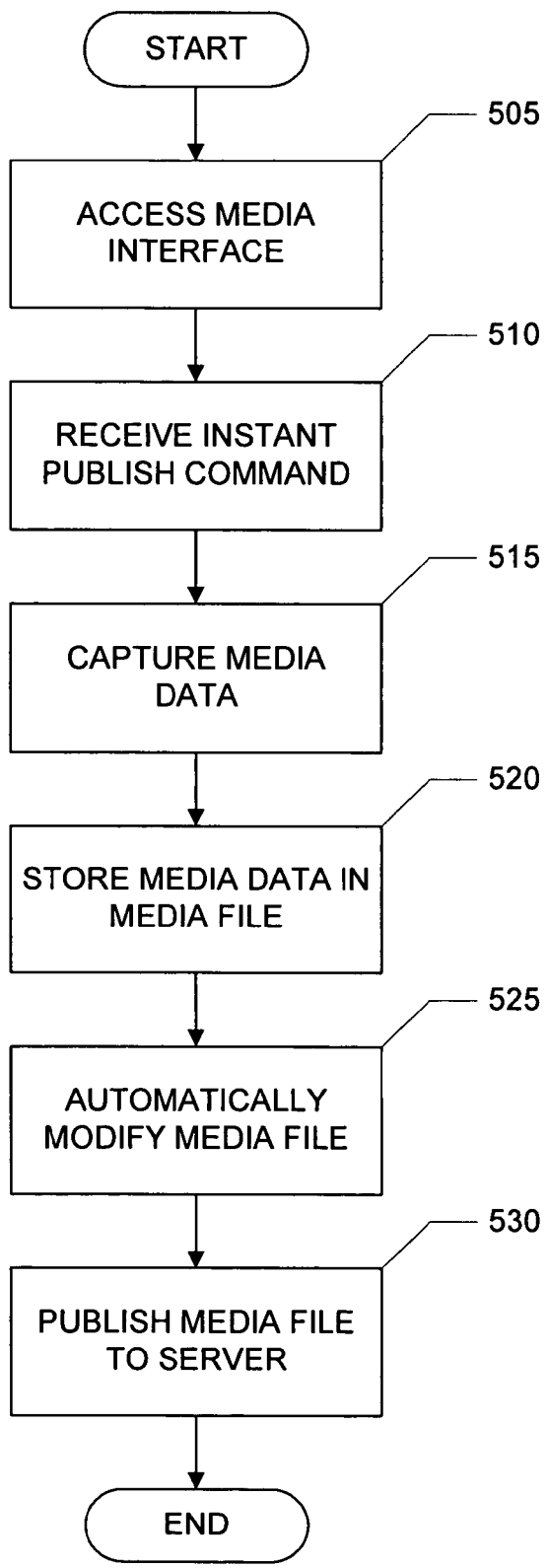
FIG. 5 shows a flowchart of publishing a media file using an instant publish command according to one implementation of the invention.

FIG. 5 shows a flowchart 500 of publishing a media file using an instant publish command according to one implementation of the invention. Initially, a user has established one or more configuration settings for a media device, such as author and current time. The configuration settings also include instant publish settings indicating how instant publishing should proceed. The instant publish settings indicate what metadata to add to a media file and indicate what modifications or editing to apply automatically to a media file, such as those available through the editing commands, as described above. In one implementation, a user sets the editing instant publish settings using the editing commands and a record feature, similar to building a macro command.

A user accesses the media interface for the publishing device, bock 505. In one implementation, the media interface is a single application executing on the publishing device. In another implementation, the media interface is the user interface for the general operation of the publishing device, including operations for publishing media data.

The user selects an instant publish command through the media interface, block 510. In one implementation, the user selects the instant publish command by pressing a single button. In other implementations, the instant publish command can be activated through various mechanisms, such as selecting a menu item.

In response to the instant publish command, the publishing device captures media data, block 515, and stores the captured media in a media file, block 520. The publishing device captures and stores media data as described above referring to FIG. 4.

The publishing device modifies the media file according to the configuration settings previously set by the user, block 525. As described above, the user establishes editing settings as part of the instant publish configuration settings that indicate editing operations to occur in instant publishing. The editing settings cause the publishing device automatically to modify, supplement, or annotate the media data in the media file, as described above referring to editing in FIG. 4. The publishing device also adds metadata to the media file according to the configuration settings, as described above referring to metadata in FIG. 4. The configuration settings can indicate that information is to be obtained automatically at the time of instant publishing, rather than using previously stored information. In one example, the configuration settings indicate that the user's heart rate is to be determined at the time instant publishing is requested and from that heart rate the user's current mood is to be estimated and added as metadata to the media file. In one implementation using media channels, the publishing device adds metadata indicating the media file is to be published to one or more channels according to configuration settings set by the user. If the publishing device does not modify the media file, block 525 is skipped.

The publishing device publishes the media file, block 530. After completing any modifications, the publishing device automatically publishes the media file, as described above referring to publishing in FIG. 4. The publishing device sends the media file to a server through the network to be published to the indicated network media channel.

The server stores the received media file as a published file. In response to access requests from authorized clients, the server provides access to the media data stored in published media files.

In another implementation, the instant publish command causes a semi-automated publishing operation to begin. In this case, the publishing device prompts the user for certain information (e.g., a title) but proceeds in an automated sequence, similar to a script. For example, in one implementation, the publishing device provides a preview mode to view the modified media data and metadata before publishing the media file. In this way, publishing is streamlined and allows customization at the same time.

The various implementations of the invention are realized in electronic hardware, computer software, or combinations of these technologies. Some implementations include one or more computer programs executed by a programmable processor or computer. For example, referring to FIG. 2, in one implementation, the media device 200 includes one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using audio and video data for mobile devices, different types of data (e.g., text) can be captured and published and different types of devices or systems can be used, such as fixed or embedded systems (e.g., a personal computer, a network enabled appliance, or a vehicle). Accordingly, the present invention is not limited to only those implementations described above.

What is claimed is:

1. A computer-implemented method of publishing media data, comprising:
    accessing a media interface of a media device;
    capturing media data using a media capture component of said media device;
    storing said captured media data in a media file in storage of said media device;
    modifying said captured media data; and
    publishing said modified media data to a network server;
    wherein said capturing, modifying, and publishing are performed using an instant publish command of said media interface, which is accessed through a single and same operation of said media device;
    wherein said performance of said capturing, modifying, and publishing using said instant publish command is made possible by initially configuring the media device with settings for edits, user metadata, and automatic metadata to be added to said captured media data, and by selecting a publishing recipient and any desired publishing rules provided by a selected publishing service.

2. The method of claim 1, wherein:
said single operation is pushing one button on said mobile device.

3. The method of claim 1, wherein:
said instant publish command is accessed through a remote operation of said media device.

4. The method of claim 1, wherein:
said modifying includes editing said captured media data using one or more editing commands within said media interface.

5. The method of claim 4, wherein:
said editing includes changing an image represented by said media data.

6. The method of claim 1, wherein:
said modifying includes adding metadata to said captured media data.

7. The method of claim 6, wherein:
said metadata includes user metadata defined by a user of said media device.

8. The method of claim 7, wherein:
said user metadata includes author information.

9. The method of claim 6, wherein:
said metadata includes automatic metadata generated by said mobile device.

10. The method of claim 9, wherein:
said automatic metadata is generated when said media data is captured.

11. The method of claim 9, wherein:
said automatic metadata includes biometric information for the user of said mobile device.

12. A media device, comprising:
a control component;
a media capture component connected to said control component;
a media interface connected to said control component;
storage connected to said control component and to said media capture component; and
a network interface connected to said control component and to said storage;
wherein said media interface provides one or more media configuration commands to set one or more configuration settings, a capture media command to capture media data using said capture media component, one or more editing commands to modify captured media data, and a publish command to publish said modified media data through said network interface;
wherein said media interface is configured to issue an instant publish command that sets said capture media command, said one or more editing commands, and said publish command to capture media, modify captured media data, and publish said modified media data using a single operation element of said media device; and
wherein said instant publish command that sets said capture media command, said one or more editing commands, and said publish command using a single operation element is made possible by initially configuring said media device with settings for edits, user metadata, and automatic metadata to be added to said captured media data, and by selecting a publishing recipient and any desired publishing rules provided by a selected publishing service.

13. The media device of claim 12, wherein:
said single operation element is a push button.

14. The media device of claim 12, wherein:
said instant publish command causes said mobile device to modify said captured media device according to configuration settings set through said media interface.

15. The media device of claim 12, further comprising:
a remote command interface for receiving and processing remote commands.

16. The media device of claim 15, wherein:
said remote command interface provides a remote instant publish command.

17. The media device of claim 12, wherein:
said configuration settings include metadata to add to media data captured by said media capture component.

18. The media device of claim 12, wherein:
one of said one or more editing commands provides for modifying an image represented by media data captured by said media capture component.

19. The media device of claim 12, wherein:
said media device is a mobile telephone.

20. A system for publishing media data, comprising: a processor
a media interface of a media device;
means for accessing said media interface;
means for capturing media data using a media capture component of said media device;
means for storing said captured media data in a media file in storage of said media device;
means for modifying said captured media data;
means for publishing said modified media data to a network server;
wherein said capturing, modifying, and publishing are performed using an instant publish command of a media interface, which is accessed through a single and same operation of said media device;
wherein said performance of said capturing, modifying, and publishing using said instant publish command is made possible by initially configuring the media device with settings for edits, user metadata, and automatic metadata to be added to said captured media data, and by selecting a publishing recipient and any desired publishing rules provided by a selected publishing service.

21. A computer program, stored on storage medium, for use in publishing media data, the program comprising executable instructions that cause a computer to:
access a media interface of a media device;
capture media data using a media capture component of said media device;
store said captured media data in a media file in storage of said media device;
modify said captured media data;
publish said modified media data to a network sewer;
wherein said capturing, modifying, and publishing are performed using an instant publish command of said media interface, which is accessed through a single and same operation of said media device; and
wherein said performance of said capturing, modifying, and publishing using said instant publish command is made possible by initially configuring the media device with settings for edits, user metadata, and automatic metadata to be added to said captured media data, and by selecting a publishing recipient and any desired publishing rules provided by a selected publishing service.

* * * * *